(12) United States Patent
Choo et al.

(10) Patent No.: US 10,989,386 B2
(45) Date of Patent: Apr. 27, 2021

(54) LIGHT GUIDE FOR VEHICLE

(71) Applicants: Hyundai Motor Company, Seoul (KR); Kia Motors Corporation, Seoul (KR); SL Corporation, Daegu (KR)

(72) Inventors: Dong-Hoon Choo, Suwon-Si (KR); Jae-Hun Lee, Anyang-Si (KR); Seung-Gyo Jung, Daegu (KR); Kwang-Ryeol Park, Hwaseong-Si (KR); Su-Jung Lee, Daegu (KR)

(73) Assignees: Hyundai Motor Company, Seoul (KR); Kia Motor Company, Seoul (KR); SL Corporation, Daegu (KR)

( * ) Notice: Subject to any disclaimer, the term of this patent is extended or adjusted under 35 U.S.C. 154(b) by 94 days.

(21) Appl. No.: 16/202,394

(22) Filed: Nov. 28, 2018

(65) Prior Publication Data

US 2019/0271447 A1 Sep. 5, 2019

(30) Foreign Application Priority Data

Mar. 5, 2018 (KR) .......................... 10-2018-0025873

(51) Int. Cl.
*F21V 7/04* (2006.01)
*F21S 41/24* (2018.01)
*F21V 8/00* (2006.01)

(52) U.S. Cl.
CPC .............. *F21S 41/24* (2018.01); *G02B 6/002* (2013.01); *G02B 6/0035* (2013.01); *G02B 6/0068* (2013.01); *G02B 6/0076* (2013.01)

(58) Field of Classification Search
CPC ........ F21S 41/24; F21S 43/241; F21S 43/237; F21S 43/315; F21S 41/151; F21V 7/0091; F21V 7/09; G02B 6/0016; F21K 9/61
See application file for complete search history.

(56) References Cited

U.S. PATENT DOCUMENTS

| 2012/0014111 A1* | 1/2012 | Welten | F21V 3/00 |
| | | | 362/296.08 |
| 2014/0321139 A1* | 10/2014 | Bungenstock | F21S 41/10 |
| | | | 362/511 |
| 2018/0149325 A1* | 5/2018 | Lee | F21S 41/32 |

FOREIGN PATENT DOCUMENTS

| JP | 2006-164908 A | 6/2006 |
| JP | 2011-054523 A | 3/2011 |
| JP | 2016-194983 A | 11/2016 |
| KR | 10-0947927 B1 | 3/2010 |
| KR | 2014-0083807 A | 12/2012 |

* cited by examiner

*Primary Examiner* — William J Carter
*Assistant Examiner* — Omar Rojas Cadima
(74) *Attorney, Agent, or Firm* — Morgan, Lewis & Bockius LLP

(57) ABSTRACT

A light guide may include a light source configured to emit light, a first light guide configured to guide the light emitted from the light source, and a second light guide disposed outside the first light guide and configured to guide the light.

22 Claims, 8 Drawing Sheets

LIGHT GUIDE FOR VEHICLE

CROSS-REFERENCE(S) TO RELATED APPLICATIONS

The present application claims priority to Korean Patent Application No. 10-2018-0025873, filed on Mar. 5, 2018, the entire contents of which is incorporated herein for all purposes by this reference.

BACKGROUND OF THE INVENTION

Field of the Invention

The present invention relates to a light guide for a vehicle. More particularly, it relates to a light guide for a vehicle, which is configured for uniformly lighting an entire light guide region and improving a degree of freedom of design.

Description of Related Art

Generally, a lighting device configured to illuminate a traveling direction of a vehicle is provided at a vehicle to secure a field of view ahead of the vehicle while the vehicle is traveling at night, determine obstacles and pedestrians, and inform another vehicle and a user which are using the same road on which the vehicle is traveling.

According to the recent tendency to focus on design, such a lighting device has been developed in various forms to enhance an aesthetic impression of an exterior of a vehicle, and specifically, a light guide of the lighting device configured to reflect light received from a light source to exhibit an indirect lighting effect without directly exposing the light source, which emits the light, have been recently widely applied to a vehicle. The light guide is mainly attached to a front edge portion of a bezel of a headlamp provided at a front side of a vehicle to improve an aesthetic impression of an external of the vehicle.

Here, the light guide is a component which provides a path for uniformly scattering and diffusing a light emitted from a light source. A light emitting diode (LED) light source which is a point light source configured to emit light having directivity is disposed at a side surface of the light guide, and the light incident from the LED light source is converted into surface light through the light guide and then is emitted.

Thus, the light guide may exhibit an indirect lighting effect without directly exposing the LED light source emitting the light, and the indirect lighting effect of the light guide serves to improve an aesthetic impression. Therefore, according to the recent tendency to focus on an aesthetic effect as well as lighting and signal functions of a lamp device for a vehicle, the light guide is being applied to the lamp device for a vehicle.

FIG. 1 is a mimetic diagram of a lamp device for a vehicle to which a conventional light guide is applied.

Referring to FIG. 1, there are shown a front view of a lighting region W and cross-sectional views taken along lines A-A and B-B in the lamp device for a vehicle, and a light source 15 is formed at a printed circuit board to emit light, wherein the printed circuit board may control turning on or off of the light source 15 and the light source 15 may be an LED.

A guide portion 10 may guide light emitted from the light source 15 and extend in a predetermined length and may be formed to have a circular or polygonal cross-sectional shape.

Accordingly, the light emitted from the light source 15 is guided along the guide portion 10 and then is emitted, and an invalid portion 20 is provided to prevent a hot spot.

However, a dark portion is generated due to a loss of light while the light emitted from the light source 15 is guided along the guide portion 10. Therefore, brightness of the light guide is lowered due to the dark portion formed by the loss of light and thus discrimination is degraded such that there is a problem lighting sensitivity deteriorates.

Furthermore, since an invalid portion is provided to prevent the hot spot, a structure is complicated such that there are problems in that a working time and costs increase and power consumption increases.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a light guide configured for improving a degree of freedom of design in a light guide structure and preventing a loss of light to allow uniform lighting while blocking generation of a dark portion.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a light guide may include a light source configured to emit light, a first light guide configured to guide the light emitted from the light source, and a second light guide disposed outside the first light guide and configured to guide the light.

The light source may include a first light source, and a second light source disposed adjacent to the first light source.

The first light source and the second light source may be simultaneously turned on or off.

The first light guide may include a first incident portion, a curved surface portion extending from the first incident portion, and a first emitting portion extending from the curved surface portion.

The second light guide may include a second incident portion, a main body extending from the second incident portion, a side wall disposed inside the main body, and a second emitting portion disposed at an end portion of the main body.

A first diffusion hole may be formed at the main body.

The first diffusion hole may have an inverted funnel structure on the basis of a plane.

A convex portion having a convex shape may be formed on an emitting surface of the first diffusion hole.

The convex portion may be disposed on an optical axis of a second light source of the light source.

A second diffusion hole may be formed at the main body.

The second diffusion hole may have an inverted funnel structure on the basis of the plane.

A diffusion optic may be provided at the second diffusion hole.

A height of a second emitting portion of the second light guide may correspond to a diameter of the first light guide.

The height of the second emitting portion of the second light guide may correspond to a height of the first light guide.

A curvature range of the curved surface portion may be in the range of 2 to 10 times a diameter.

In accordance with various exemplary embodiments of the present invention, a light guide may include a light source configured to emit light, a first light guide configured to guide the light emitted from the light source, a second light guide disposed outside the first light guide and configured to guide the light, and a third light guide disposed at a position vertically facing the first light guide on the basis of a front surface of the light guide and configured to guide the light.

The first light guide may include a first incident portion, a first curved surface portion extending from the first incident portion, and a first emitting portion extending from the curved surface portion.

The second light guide may include a second incident portion, a main body extending from the second incident portion, a side wall disposed at both sides of the main body, and a second emitting portion disposed at an end portion of the main body, wherein a first diffusion hole and a second diffusion hole may be formed at the main body.

The third light guide may include a third incident portion, a second curved surface portion extending from the third incident portion, and a third emitting portion extending from the second curved surface portion.

In accordance with yet another exemplary embodiment of the present invention, a light guide may include a light source configured to emit light, a first light guide configured to guide the light emitted from the light source, a second light guide disposed outside the first light guide and configured to guide the light, and a third light guide disposed at a position laterally facing the first light guide on the basis of a front surface of the light guide and configured to guide the light.

The first light guide may include a first incident portion, a first curved surface portion extending from the first incident portion, and a first emitting portion extending from the curved surface portion.

The second light guide may include a second incident portion, a main body extending from the second incident portion, a side wall positioned inside the main body, and a second emitting portion disposed at an end portion of the main body, wherein a first diffusion hole and a second diffusion hole may be formed at the main body.

The third light guide may include a third incident portion, a second curved surface portion extending from the third incident portion, and a third emitting portion extending from the second curved surface portion.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
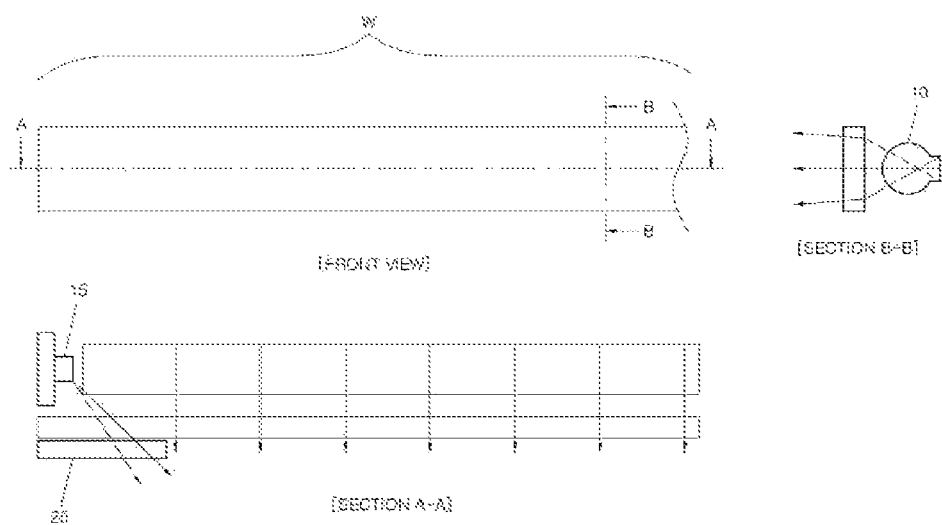
FIG. 1 is a mimetic diagram of a lamp device configured for a vehicle to which a conventional light guide is applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The exemplary embodiments to be described below are provided to facilitate a person skilled in the art to easily understand the technical spirit of the present invention, and thus the present invention is not limited thereto. Furthermore, items shown in the drawings are schematically illustrated to easily describe the exemplary embodiments of the present invention, and the items may be different from those actually implemented.

It may be understood that when a component is referred to as being connected or coupled to other component, the component may be directly connected or coupled to the other component, and another component may be present between the component and the other component.

The term "connection" used herein may include a direct connection and an indirect connection between one member and another member, and refer to all physical connections such as adhesion, attachment, engagement, fixing, bonding, and the like.

Furthermore, the expressions such as "first," "second," and the like are used only to distinguish a plurality of configurations from each other, and do not limit the order or other features among the configurations.

The singular form includes the plural form unless the context clearly notes otherwise. In this description, the terms "comprising," "having," or the like are used to specify that a feature, a number, a step, an operation, a component, an element, or a combination thereof described herein exists, and they may be construed that one or more other features, numbers, steps, operations, components, elements, or combinations thereof may be added.

Figure 2:
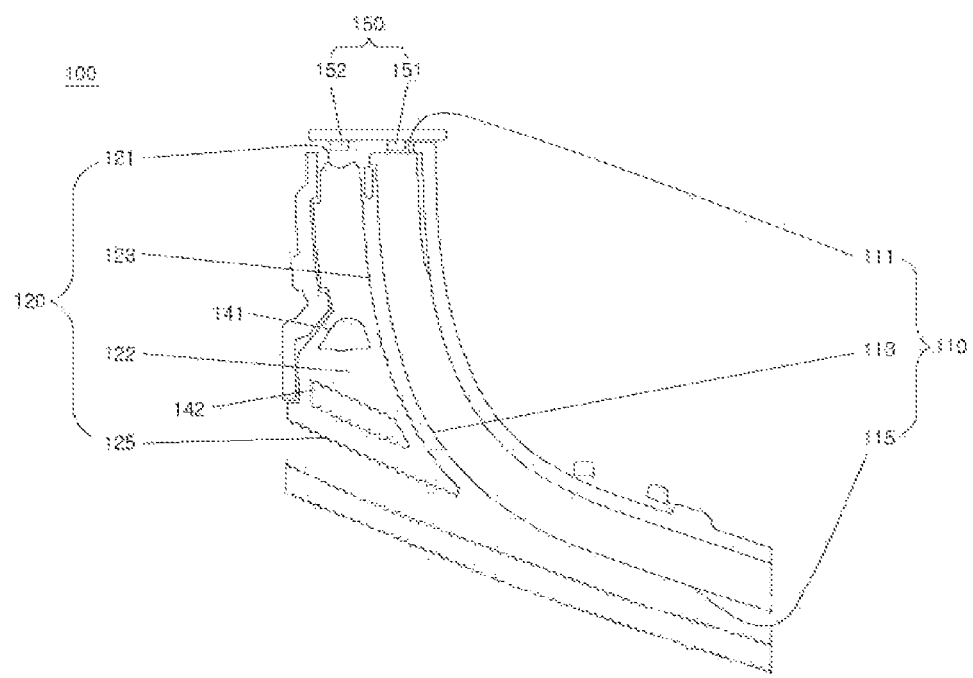
FIG. 2 is a mimetic diagram of a light guide according to an exemplary embodiment of the present invention.

FIG. 2 is a mimetic diagram of a light guide according to an exemplary embodiment of the present invention.

Referring to FIG. 2, a light guide 100 for a vehicle according to an exemplary embodiment of the present invention includes a light source 150 configured to emit light, a first light guide 110 configured to guide light emitted from the light source 150, and a second light guide 120 disposed outside the light guide 110 and configured to guide the light.

In one specific example, the light source 150 includes a first light source 151 and a second light source 152 disposed adjacent to the first light source 151. Here, the first light source 151 and the second light source 152 are preferably simultaneously turned on or off.

According to an exemplary embodiment of the present invention, the first light guide 110 includes a first incident portion 111, a curved surface portion 113 extending from the first incident portion 111, and a first emitting portion 115 extending downwardly from the curved surface portion 113.

Furthermore, the second light guide 120 includes a second incident portion 121, a main body 122 extending from the second incident portion 121, a side wall 123 disposed inside the main body 122, and a second emitting portion 125 disposed at an end portion of the main body 122.

In the present structure, a first diffusion hole 141 and a second diffusion hole 142 are formed at the main body 122, and the first diffusion hole 141 and the second diffusion hole 142 are configured in inverted funnel structures.

According to an exemplary embodiment of the present invention, a height of the second emitting portion 125 of the second light guide 120 preferably corresponds to a diameter of the first light guide 110 or to a height thereof.

Figure 3:
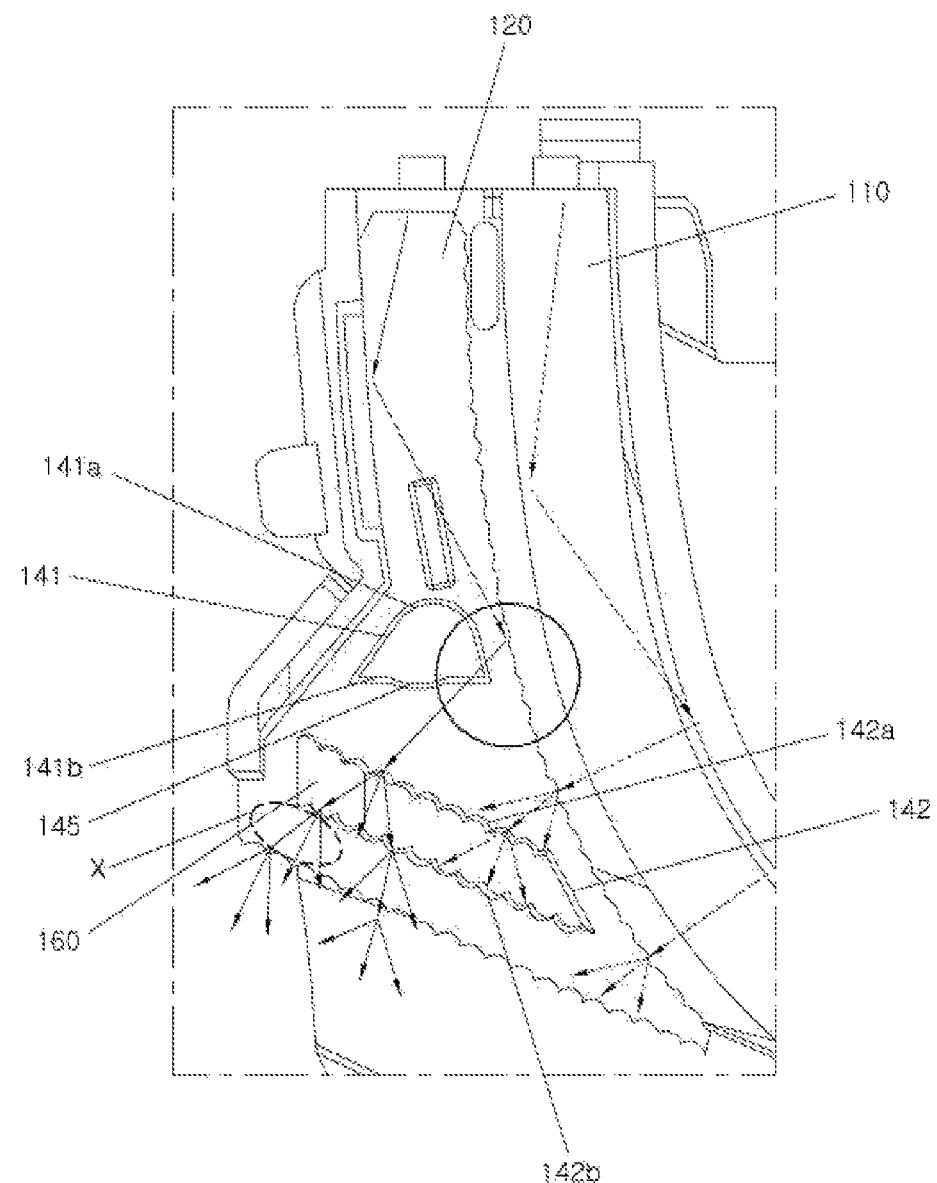
FIG. 3 is a mimetic diagram illustrating an emitting path of the light guide of FIG. 2 according to an exemplary embodiment of the present invention.

FIG. 3 is a mimetic diagram illustrating an emitting path of the light guide of FIG. 2 according to an exemplary embodiment of the present invention.

Referring to FIG. 3 together with FIG. 2, the light guide 100 for a vehicle includes the light source 150 configured to emit light, the first light guide 110 configured to guide light emitted from the light source 150, and the second light guide 120 disposed outside the first light guide 110 and configured to guide the light, and the second light guide 120 includes the second incident portion 121, the main body 122 extending from the second incident portion 121, the side wall 123 disposed inside the main body 122, and the second emitting portion 125 disposed at the end portion of the main body 122, and the side wall 123 is configured to totally reflect the light emitted from the second light source 152 of the second light guide 120 and at the same time, is configured to receive the light emitted from the first light guide 110 and diffuse the received light inside the second light guide 120.

In an exemplary embodiment of the present invention, the inner surface of the side wall 123 is formed of embossings.

In an exemplary embodiment of the present invention, the inner surface of the second emitting portion 125 is formed of embossings.

As shown in the drawing, the side wall 123 may totally reflect the light emitted from the second light source 152 to be incident into the second diffusion hole 142, and a diffusion hole 160 may also be provided at the second diffusion hole 142 such that the light may be emitted to a lighting filling vulnerable portion X to uniformly illuminate an entire region.

Furthermore, the first diffusion hole 141 is formed at the main body 122, and the first diffusion hole 141 is configured in an inverted funnel structure on the basis of a plane.

An incident surface 141a into which the light emitted from the light source 150 is incident and an emitting surface 141b on which the light is emitted are formed at the first diffusion hole 141, wherein the incident surface 141a of the first diffusion hole 141 is preferably formed to have a concave shape and a convex portion 145 having a convex shape is preferably formed at the emitting surface 141b of the first diffusion hole 141. Furthermore, the convex portion 145 is preferably disposed on an optical axis OP of the second light source 152 of the light source 150.

Furthermore, the second diffusion hole 142 is formed at the main body 122, and the second diffusion hole 142 is configured in an inverted funnel structure on the basis of a plane. Specifically, it is configured such that the light emitted from the second light source 152 is incident into the second diffusion hole 142 through the first diffusion hole 141.

Figure 4:
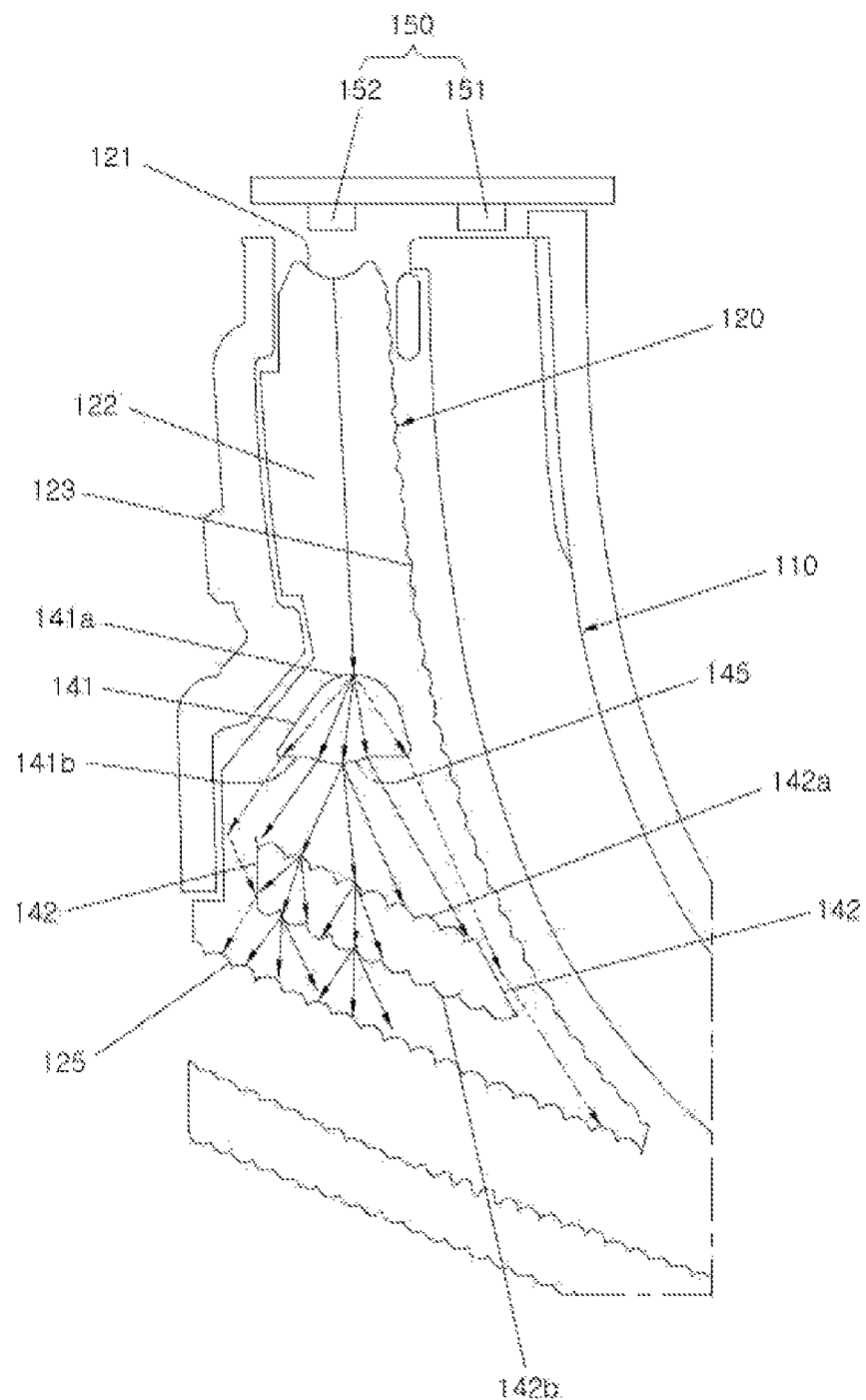
FIG. 4 is another mimetic diagram illustrating an emitting path of the light guide of FIG. 2 according to an exemplary embodiment of the present invention.
Figure 5:
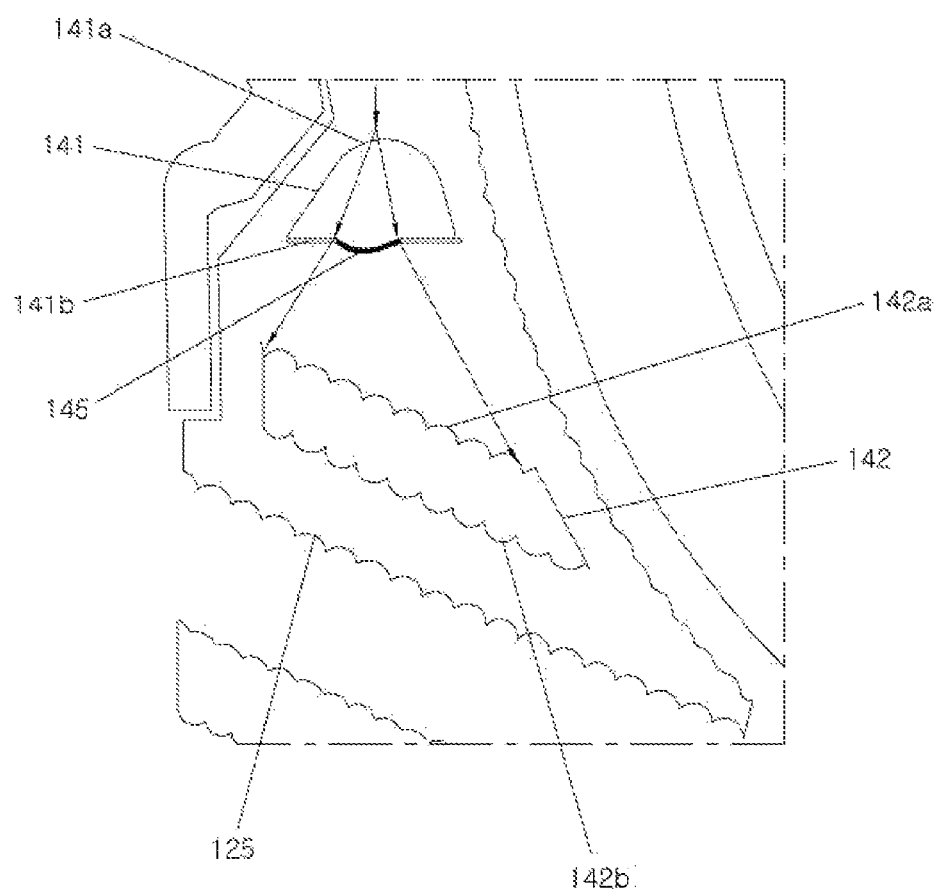
FIG. 5 is a mimetic diagram illustrating an emitting path of diffusion holes of the light guide of FIG. 4 according to an exemplary embodiment of the present invention.

FIG. 4 is another mimetic diagram illustrating an emitting path of the light guide of FIG. 2 according to an exemplary embodiment of the present invention, and FIG. 5 is a mimetic diagram illustrating an emitting path of diffusion holes of the light guide of FIG. 4 according to an exemplary embodiment of the present invention.

Referring to FIG. 4 and FIG. 5 together with FIG. 2, the light guide 100 for a vehicle includes the light source 150 configured to emit light, the first light guide 110 configured to guide light emitted from the light source 150, and the second light guide 120 disposed outside the first light guide 110 and configured to guide the light, and the second light guide 120 includes the second incident portion 121, the main body 122 extending from the second incident portion 121, the side wall 123 disposed inside the main body 122, and the second emitting portion 125 disposed at the end portion of the main body 122, and the first diffusion hole 141 and the second diffusion hole 142 are formed at the main body 122.

In one specific example, the light source 150 includes the first light source 151 and the second light source 152 disposed adjacent to the first light source 151.

According to an exemplary embodiment of the present invention, the light incident into the second light guide 120 is diffused to an entire region of the second emitting portion 125 while passing through the first diffusion hole 141 and the second diffusion hole 142, the incident surface 141a of the first diffusion hole 141 is formed to have a concave shape, and the convex portion 145 is formed at the flat emitting surface 141b, on which the light is emitted, to diffuse and transmit the light to the second diffusion hole 142.

Like the first diffusion hole 141, an incident surface 142a and an emitting surface 142b are formed at the second diffusion hole 142, and the second diffusion hole 142 preferably has an optical shape for diffusing light. In an exemplary embodiment of the present invention, the incident surface 142a and the emitting surface 142b are formed of embossings.

Accordingly, the light incident into the first diffusion hole 141 is uniformly diffused to an entire region of the emitting surface 142b while passing through the second diffusion hole 142.

Figure 6:
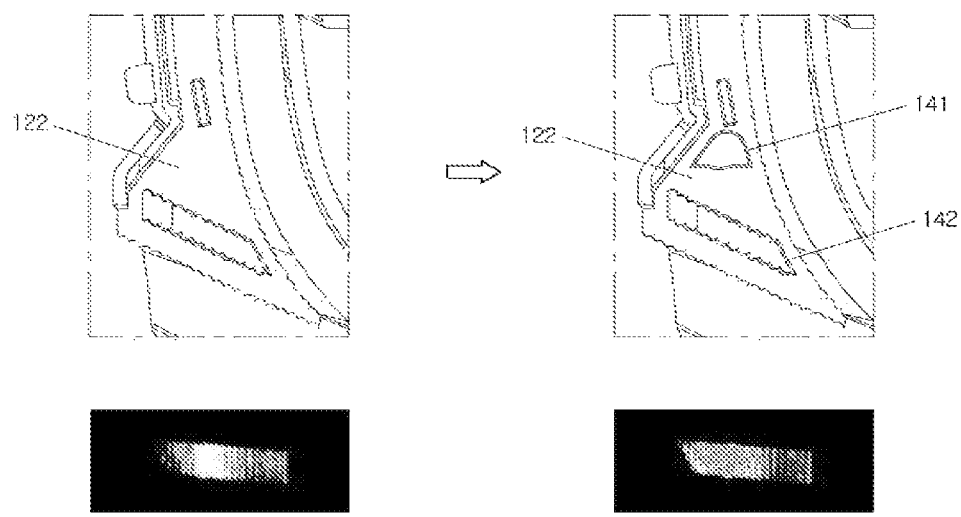
FIG. 6 is mimetic diagrams comparing cases before and after a first diffusion hole of the light guide according to an exemplary embodiment of the present invention is applied.

FIG. 6 is mimetic diagrams comparing cases before and after the first diffusion hole of the light guide according to an exemplary embodiment of the present invention is applied.

Referring to FIG. 6, there are shown the compared cases before and after the first diffusion hole 141 of the main body 122 is applied. It can be seen that a hot spot is generated at a center portion and the light is not uniformly diffused in an emitting region in the case in which the first diffusion hole 141 is not applied to the main body 122, but the light is uniformly diffused in the emitting region in the case in which the first diffusion hole 141 is applied to the main body 122.

Figure 7:
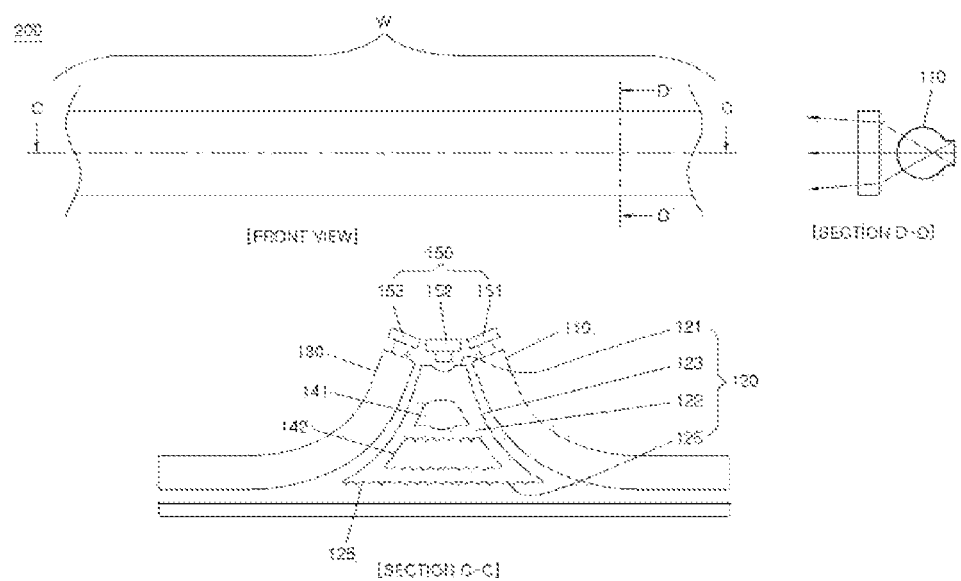
FIG. 7 is a mimetic diagram of a light guide according to another exemplary embodiment of the present invention.

FIG. 7 is a mimetic diagram of a light guide according to another exemplary embodiment of the present invention.

Referring to FIG. 7, there are shown a front view of a lighting region W of a light guide 200 and cross-sectional views taken along lines C-C and D-D, and the light guide 200 according to another exemplary embodiment of the present invention includes the light source 150 configured to emit light, the first light guide 110 configured to guide light emitted from the light source 150, the second light guide 120 disposed outside the first light guide 110 and configured to guide the light, and a third light guide 130 disposed at a position vertically facing the first light guide 110 on the basis of a front surface and configured to guide the light.

In one specific example, the light source 150 includes the first light source 151, the second light source 152 disposed adjacent to the first light source 151, and a third light source 153 disposed at a position symmetrical to the first light source 151.

Furthermore, the second light guide 120 includes the second incident portion 121, the main body 122 extending from the second incident portion 121, the side wall 123 disposed at both sides of the main body 122, and the second emitting portion 125 disposed at an end portion of the main body 122, and, referring to the cross-sectional views taken along lines C-C and D-D, the first light guide 110 and the third light guide 130 are preferably to be vertically symmetrical to each other on the basis of the plane.

Furthermore, the first diffusion hole 141 and the second diffusion hole 142 are formed at the main body 122, wherein the first diffusion hole 141 and the second diffusion hole 142 are preferably to be vertically symmetrical to each other on the basis of the plane.

According to an exemplary embodiment of the present invention, each of the first diffusion hole 141 and the second diffusion hole 142 preferably has an inverted funnel structure and an optical shape for diffusing light.

Figure 8:
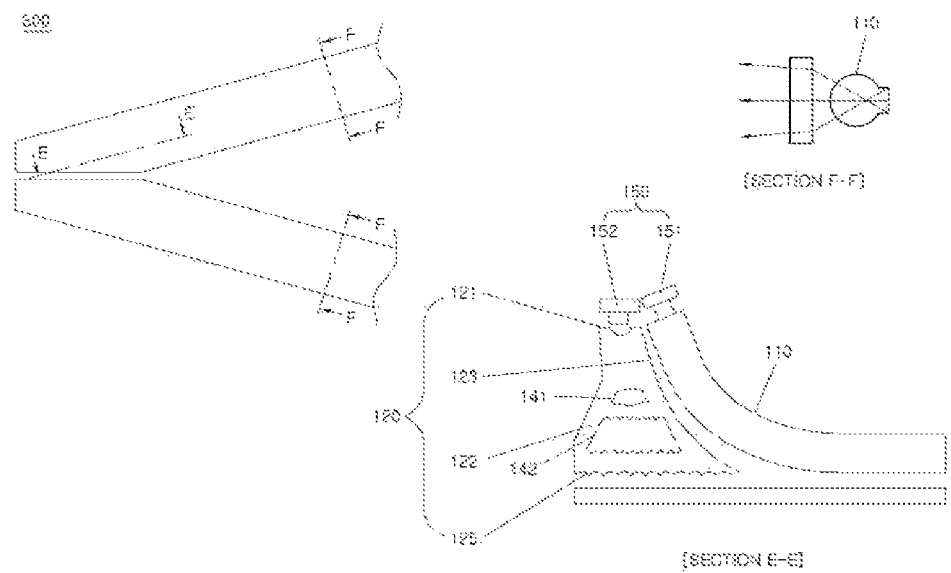
FIG. 8 is a mimetic diagram of a light guide according to yet another exemplary embodiment of the present invention.

FIG. 8 is a mimetic diagram of a light guide according to yet another exemplary embodiment of the present invention.

Referring to FIG. 8, there are shown a front view of a bent portion of a light guide 300 and cross-sectional views taken along lines E-E and F-F, and the light guide 300 according to yet another exemplary embodiment of the present invention includes the light source 150 configured to emit light, the first light guide 110 configured to guide light emitted from the light source 150, the second light guide 120 disposed outside the first light guide 110 and configured to guide the light, and a third light guide disposed at a position laterally facing the first light guide 110 on the basis of a front surface and configured to guide the light.

In one specific example, the light source 150 includes the first light source 151 and the second light source 152 disposed adjacent to the first light source 151, and the second light guide 120 also includes the second incident portion 121, the main body 122 extending from the second incident portion 121, the side wall 123 disposed inside the main body 122, and the second emitting portion 125 disposed at an end portion of the main body 122, and, referring to the cross-sectional views taken along lines E-E and F-F, the first diffusion hole 141 and the second diffusion hole 142 are formed at the main body 122, wherein the first light guide 110 and the third light guide 130 are preferably to be vertically symmetrical to each other on the basis of a plane.

Therefore, in accordance with the light guide according to an exemplary embodiment of the present invention, constrains of space are overcome such that a degree of freedom of design may be improved, and a loss of light is prevented and thus generation of a dark portion and a hot spot is blocked such that there are provided effects in that efficiency of lighting may be improved and power consumption and a weight may be reduced.

In accordance with exemplary embodiments of the present invention, it is possible to prevent a loss of light and generation of a dark portion and a hot spot such that there are provided effects in that efficiency of lighting may be improved and power consumption may be reduced.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A light guide apparatus, comprising:
   a light source including a first light source and a second light source and configured to emit light;
   a first light guide engaged to the first light source and configured to guide the light emitted from the first light source; and
   a second light guide disposed outside the first light guide and engaged to the second light source, guiding the light emitted from the first light source,
   wherein the first light guide is spaced apart at an equal distance from the second light guide,
   wherein the first light guide includes a curved surface portion with a predetermined curvature,
   wherein the second light guide includes a side wall which is formed in a corresponding curvature of the curved surface portion of the first light guide and totally reflects the light emitted from the second light source,
   wherein the second light source is disposed adjacent to the first light source,
   wherein the first light guide further includes:
      a first incident portion receiving the light from the first light source; and
      a first emitting portion extending from the curved surface portion, and wherein the curved surface portion extends from the first incident portion to the first emitting portion.

2. The light guide apparatus of claim 1, wherein the first light source and the second light source are simultaneously turned on or off.

3. The light guide apparatus of claim 1, wherein the second light guide further includes:
a second incident portion receiving the light from the second light source;
a main body extending from the second incident portion; and
a second emitting portion disposed at an end portion of the main body,
wherein the side wall is disposed inside the main body to separate the first light guide and the second light guide.

4. The light guide apparatus of claim 3, wherein a first diffusion hole including a light incident surface and a light emitting surface is formed at the main body.

5. The light guide apparatus of claim 4, wherein the first diffusion hole has an inverted funnel structure on a basis of a cross-sectional plane of the light guide apparatus.

6. The light guide apparatus of claim 5, wherein the light incident surface is formed in a convex shape and the light emitting surface includes a convex portion formed in a convex shape.

7. The light guide apparatus of claim 6, wherein the convex portion is disposed on an optical axis of the second light source.

8. The light guide apparatus of claim 4, wherein a second diffusion hole is formed at the main body and wherein the light emitted from the second light source is incident into the second diffusion hole through the first diffusion hole.

9. The light guide apparatus of claim 8, wherein a distance between the second light source and the first diffusion hole is shorter than a distance between the second light source and the second diffusion hole.

10. The light guide apparatus of claim 8, wherein the second diffusion hole has an inverted funnel structure on a basis of a cross-sectional plane of the light guide apparatus.

11. The light guide apparatus of claim 8, wherein a diffusion optic for diffusing light is provided at the second diffusion hole.

12. The light guide apparatus of claim 3, wherein a height of the second emitting portion of the second light guide corresponds to a diameter of the first light guide.

13. The light guide apparatus of claim 3, wherein a height of the second emitting portion of the second light guide corresponds to a height of the first light guide.

14. The light guide apparatus of claim 1, wherein a curvature range of the curved surface portion is in a range of 2 to 10 times a diameter thereof.

15. A light guide apparatus, comprising:
a light source configured to emit light;
a first light guide engaged to the light source and configured to guide the light emitted from the light source;
a second light guide engaged to the light source and disposed outside the first light guide and configured to guide the light emitted from the light source; and
a third light guide disposed at a position vertically facing the first light guide on a basis of a front surface of the second light guide and configured to guide the light,
wherein each of the first light guide and the third light guide is spaced apart at an equal distance from the second light guide,
wherein the first light guide includes a first curved surface portion with a predetermined curvature,
wherein the second light guide includes a side wall which is formed in a corresponding curvature of the first curved surface portion of the first light guide and totally reflects the light emitted from the second light source,
wherein the second light source is disposed adjacent to the first light source, and
wherein the first light guide further includes:
a first incident portion receiving the light from the first light source; and
a first emitting portion extending from the first curved surface portion,
wherein the first curved surface portion extends from the first incident portion to the first emitting portion.

16. The light guide apparatus of claim 15, wherein the second light guide further includes:
a second incident portion receiving the light from the light source;
a main body extending from the second incident portion; and
a second emitting portion disposed at an end portion of the main body,
wherein a first diffusion hole and a second diffusion hole are formed at the main body,
wherein the side wall is disposed at a first side and a second side of the main body, and
wherein the side wall separates the first light guide and the second light guide at the first side and the side wall separates the second light guide and the third light guide at the second side.

17. The light guide apparatus of claim 16, wherein a distance between the light source and the first diffusion hole is shorter than a distance between the light source and the second diffusion hole.

18. The light guide apparatus of claim 16, wherein the third light guide includes:
a third incident portion receiving the light from the light source;
a second curved surface portion extending from the third incident portion; and
a third emitting portion extending from the second curved surface portion.

19. A light guide apparatus, comprising:
a light source configured to emit light;
a first light guide receiving the light from the light source and configured to guide the light emitted from the light source;
a second light guide disposed outside the first light guide and receiving the light from the light source to guide the light emitted from the light source; and
a third light guide disposed at a position laterally facing the first light guide on a basis of a front surface of the second light guide and receiving the light from the light source to guide the light,
wherein each of the first light guide and the third light guide is spaced apart at an equal distance from the second light guide,
wherein the first light guide includes a first curved surface portion with a predetermined curvature,
wherein the second light guide includes a side wall which is formed in a corresponding curvature of the first curved surface portion of the first light guide and totally reflects the light emitted from the second light source,
wherein the second light source is disposed adjacent to the first light source,
wherein the first light guide further includes:
a first incident portion receiving the light from the first light source; and a first emitting portion extending from the first curved surface portion, and wherein the first curved surface portion extends from the first incident portion to the first emitting portion.

20. The light guide apparatus of claim 19, wherein the second light guide further includes:
- a second incident portion receiving the light from the light source;
- a main body extending from the second incident portion;
- a second emitting portion disposed at an end portion of the main body,
- wherein a first diffusion hole and a second diffusion hole are formed at the main body, and
- wherein the side wall is disposed inside the main body to separate the first light guide and the second light guide.

21. The light guide apparatus of claim 20, wherein a distance between the light source and the first diffusion hole is shorter than a distance between the light source and the second diffusion hole.

22. The light guide apparatus of claim 20, wherein the third light guide includes:
- a third incident portion receiving the light from the light source;
- a second curved surface portion extending from the third incident portion; and
- a third emitting portion extending from the second curved surface portion.

* * * * *